United States Patent [19]

Austgen, Jr. et al.

[11] Patent Number: 5,688,856
[45] Date of Patent: Nov. 18, 1997

[54] PROCESS FOR MAKING SUBMICRON STABLE LATEXES OF HYDROGENATED BLOCK COPOLYMERS

[75] Inventors: David M. Austgen, Jr., Missouri City; Jeffrey G. Southwick; Bing Yang, both of Houston, all of Tex.

[73] Assignee: Shell Oil Company, Houston, Tex.

[21] Appl. No.: 775,469

[22] Filed: Dec. 30, 1996

Related U.S. Application Data

[63] Continuation of Ser. No. 330,056, Oct. 27, 1994, abandoned.

[51] Int. Cl.$^6$ ............... C08J 3/07; C08K 5/01; C08L 53/00
[52] U.S. Cl. ............ 524/505; 524/284; 524/361; 524/364; 524/534; 524/575; 525/89
[58] Field of Search ............... 525/89; 524/284, 524/361, 364, 505, 534, 575

[56] References Cited

U.S. PATENT DOCUMENTS

| | | | |
|---|---|---|---|
| 3,238,173 | 3/1966 | Bailey et al. | 260/29.7 |
| 3,360,599 | 12/1967 | Nyberg et al. | 264/216 |
| 3,445,414 | 5/1969 | Glymph et al. | 260/23 |
| 3,726,824 | 4/1973 | Saunders et al. | 260/29.7 EM |
| 3,839,258 | 10/1974 | Visseren et al. | 260/29.7 |
| 4,177,177 | 12/1979 | Vanderhoff et al. | 260/29.2 M |
| 4,331,581 | 5/1982 | Davison | 524/364 |
| 4,942,209 | 7/1990 | Gunesin | 526/173 |
| 5,100,938 | 3/1992 | Vitkuske et al. | 524/68 |
| 5,292,795 | 3/1994 | Southwick et al. | 524/562 |
| 5,336,712 | 8/1994 | Austgen, Jr. et al. | 524/530 |
| 5,358,981 | 10/1994 | Southwick | 523/402 |

FOREIGN PATENT DOCUMENTS

| | | |
|---|---|---|
| 0292262 | 11/1988 | European Pat. Off. . |
| 50-26849 | 3/1975 | Japan . |
| 56-115345 | 9/1981 | Japan . |
| 1416932 | 1/1973 | United Kingdom . |

OTHER PUBLICATIONS

"Rheological and Morphological Behavior of Styrene–Butadiene Diblock Copolymer Solutions in Selective Solvents," by H. Watanabe and T. Kotaka, *Journal of Rheology*, vol. 26, pp. 153–179, 1982.

"Micelles of Block and Graft Copolymers in Solutions," by Z. Tuzar and P. Kratochvil, *Surface and Colloid Science*, E. Matijevic Ed. Plenum Press, New York, vol. 15, pp. 1–83, 1993.

P. 386 from Chapter VII "Solvents and Non–Solvents for Polymers," by O. Fuchs, *Polymer Handbook*, 3rd Ed., J. Brandrup and E. H. Immergut (Editors), John Wiley & Sons, New York, 1989.

Kraton® Polymers Presentation Vugraph, Oct. 28, 1993.

*Primary Examiner*—George F. Lesmes
*Assistant Examiner*—U. K. Rajguru
*Attorney, Agent, or Firm*—Donald F. Haas

[57] ABSTRACT

This invention is a process for producing stable polymer emulsions and latexes with an average particle size of less than one micron. The polymers are hydrogenated block copolymers of conjugated dienes and vinyl aromatic hydrocarbons which may or may not contain polar functionality. The process comprises making a polymer cement of the polymer and a blend of a non-aromatic solvent for the vinyl aromatic hydrocarbon block which is immiscible with water and a non-aromatic cosolvent, emulsifying the polymer cement by adding it to an aqueous phase containing at least one surfactant and removing the solvent, cosolvent and excess water.

14 Claims, No Drawings

PROCESS FOR MAKING SUBMICRON STABLE LATEXES OF HYDROGENATED BLOCK COPOLYMERS

This is a continuation of application Ser. No. 08/330,056, filed Oct. 27, 1994 now abandoned.

BACKGROUND OF THE INVENTION

This invention relates to the production of fine stable latexes of hydrogenated block copolymers of vinyl aromatic hydrocarbons and conjugated dienes. More specifically, it relates to the production of such latexes which have average particle sizes less than two microns and low surfactant to polymer ratios by using appropriate solvents and cosolvents during preparation of the latexes.

It is known that a block copolymer can be obtained by an anionic copolymerization of a conjugated diene compound and an alkenyl arene compound by using an organic alkali metal initiator. Block copolymers have been produced which comprise blocks of these different monomers such as configurations which are linear, radial or star, i.e. many arms radiating from a central core. The proportion of thermoplastic blocks to elastomeric blocks and the relative molecular weights of each of these blocks is balanced to obtain a rubber having unique performance characteristics.

It has been found advantageous to prepare water-based latexes of these polymers in order to obtain products that can be formulated into coatings and adhesives containing little or no organic solvent. In some cases, low levels of organic solvents are useful to control evaporation of water or to serve as coalescing aids. But the quantity of organic solvent needed to control evaporation or aid coalescence will be much less than that needed to make corresponding coatings and adhesive films from organic solvent solutions (solvent-borne coatings and adhesives). Therefore, these latexes are comprised of the polymer, surfactants, and coalescing and evaporation control solvents and water.

Preparation of such latexes is well known to those skilled in the art (see U.S. Pat. Nos. 3,360,599, 3,238,173 and 3,726,824). Latexes of hydrogenated polyvinyl aromatic—polydiene block copolymers are conventionally made by (1) dissolving the block copolymer in an organic solvent or solvents to form a polymer cement, (2) emulsifying the polymer cement in an aqueous solution containing one or more surfactants, and (3) stripping the emulsion of organic and excess aqueous liquids to form a stable, suitably concentrated latex. Polymer cements are often available directly from the polymerization reactor.

Emulsification involves dispersing of the polymer cement as drops within the aqueous surfactant solution (the continuous phase) using a high shear mixing device. Emulsification generally proceeds by the deforming, stretching, and disrupting of large cement drops, thereby causing them to break up into smaller drops. Drop breakup is opposed by cohesive forces of the dispersed phase, as represented by cement viscosity and elasticity, and by the interfacial tension between dispersed cement drops and the continuous aqueous phase.

Block copolymer cement solutions that are to be emulsified typically contain from 10 to 35 weight percent polymer. It is advantageous for the polymer concentration in the cement to be as high as possible. Increasing the polymer concentration in the cement reduces the amount of solvent and excess water that must be removed following emulsification. However, individual polymers in concentrated high molecular weight polymer solutions will be entangled. High molecular weight polymers that are entangled are not able to relax or disentangle sufficiently quickly at high shear rates such as those imposed during emulsification with a high shear mixer. This inability to disentangle causes the polymer solution to be elastic. Polymer solutions that are elastic oppose drop deformation and breakup in much the same way that a rubber band opposes stretching. Hence, polymer entanglement opposes drop breakup during emulsification and can limit the minimum drop size that can be achieved by a given emulsification mixing device operating at a fixed energy input level.

Drop deformation and breakup is also opposed by interfacial tension. The pressure gradients required to deform and break up cement drops are directly proportional to the interfacial tension between the cement and aqueous phases. A high interfacial tension opposes drop breakup. Therefore, reducing the interfacial tension allows smaller drops to be made with a given mixing device. Surfactants are usually used as emulsifiers to lower interfacial tension. Hence, use of an effective surfactant allows a smaller average drop size to be made with a given mixing device operating at a fixed energy level.

For some hydrogenated block copolymers it is not practically possible to make stable block copolymer cement emulsions with average drop size of less than one to two microns from cements containing a single solvent unless the polymer concentration in the cement is less than 10 weight percent. This is true even if substantial surfactant is added to lower the cement-water interfacial tension. This is especially true for functionalized hydrogenated block copolymers containing polar groups that may associate. It is also true for unfunctionalized block copolymers having total molecular weights of 25,000 or more and polyvinyl aromatic block molecular weights of 5000 or more.

Fine polymer cement emulsions are necessary in order to make fine latexes. Fine particle size latexes are advantageous because particles remain stable and dispersed over long periods of time. Large particles, those significantly greater than one to two microns, tend to cream because the density of the cement is less than the density of the aqueous phase. It is also known that small particle sizes in latexes can enhance coating and adhesive appearance, coalescence, and performance. Thus, it is highly advantageous to be able to produce a stable polymer cement emulsion with an average drop size of less than two microns.

In a prior development, this result was achieved by dissolving the polymer in a solvent blend in which the primary or major solvent had a solubility parameter of less than 8.7 and the cosolvent or minor solvent had a solubility parameter of 8.7 to 9.9. However, with this process it was preferred that the emulsification be carried out using very intense, turbulent mixing such as that produced by ultrasound (e.g. from a sonic horn) which is difficult and expensive to duplicate in commercial operations. Thus, there is a need for a method of making such small drop size emulsions using commercially available high shear mixing devices. The present invention provides such a process.

SUMMARY OF THE INVENTION

This invention provides a process for producing stable polymer latexes with an average particle size of less than one micron. First, a polymer cement is formed comprising up to 35 weight percent of a hydrogenated block copolymer of a conjugated diene and a vinyl aromatic hydrocarbon having an overall molecular weight of 25,000 or more and a vinyl aromatic hydrocarbon block molecular weight of 5000 or more in a blend of a non-aromatic solvent for the vinyl aromatic hydrocarbon block having a solubility parameter of 8.3 to 9.5 which is a poor solvent for the hydrogenated polydiene block and is not miscible with water, and a non-aromatic cosolvent having a solubility parameter from 7.0 to 8.2, which is a poor solvent for the vinyl aromatic hydrocarbon block.

The solvent for the vinyl aromatic hydrocarbon block usually comprises from 70 to 95 percent by weight of the solvent blend, but in some cases, it can be 100 percent. The preferred solvents for the vinyl aromatic hydrocarbon block are ethyl acetate and propyl acetate.

The cement is then emulsified in an aqueous solution containing from 0.1 to 10% weight percent of at least one surfactant. The weight ratio of aqueous phase to cement can range from 10:1 to 1:3, preferably 2:1 to 1:3. Finally the solvent and cosolvent are stripped from the emulsion using conventional techniques. Excess water can be removed simultaneously or sequentially with the organic solvents to concentrate the latex.

DETAILED DESCRIPTION OF THE INVENTION

As is well known, block copolymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,2-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethylstyrene, vinylnaphthalene, vinylanthracene and the like may be used. The block copolymers may have linear, radial, or star configurations.

Polymers containing ethylenic unsaturation or both aromatic and ethylenic unsaturation may be prepared using free-radical, cationic and artionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these ABA block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organithium compounds having the general formula:

$RLi_n$ 

Wherein:

R is an aliphatic, cycloaliphatic, aromatic or alkyl-substituted aromatic hydrocarbon radical having from 1 to about 20 carbon atoms; and n is an integer of 1 to 4.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521, and 4,208,356 which are herein incorporated by reference. If desired, these block copolymers can be hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, which is also incorporated by reference.

The functionalized block copolymers of the present invention are hydrogenated block copolymers which have been reacted with various acid-functional group-containing molecules. The acid-functional group containing molecules which may be reacted with such block-copolymers to produce a functionalized block copolymer useful in the present invention include acid or anhydride groups or derivatives thereof. Functionalized polymers containing carboxyl groups reacted onto the vinyl aromatic hydrocarbon block are described in U.S. Pat. No. 4,868,245 which is herein incorporated by reference. The preferred acid monomers for functionalizing the polymers of the present invention are those which can be grafted onto the diene block of the polymer in free radical initiated reactions. Such preferred monomers include acids or anhydrides or derivatives thereof such as carboxylic acid groups and their salts, arthydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent. Sulfonic acid-functionalized polymers, such as described in U.S. Pat. No. 4,086,171 which is herein incorporated by reference, may also be used. The acid-functionalized hydrogenated block copolymers utilized may contain at least about 0.1% of the functional groups and preferably from about 0.5% to about 30%.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.

2. *Light Scattering From Polymer Solutions*, M. B. Huglin, ed., Academic Press, New York, N.Y., 1972.

3. W. K. Kai and A. J. Havlik, *Applied Optics*, 12, 541 (1973).

4. M. L. McConnell, *American Laboratory*, 63, May, 1978.

According to the prior art, cements are generally prepared by mixing the block copolymer of a conjugated diene and vinyl aromatic in a single solvent that is capable of dissolving the entire polymer. Because the polydiene block(s) (elastomeric block) usually comprises the major fraction of the molecular weight of a polydiene-polyvinyl aromatic block copolymer, a single solvent that is a good solvent for polydiene block is most often used to make a cement. These are generally solvents having solubility parameters close to that of the polydiene block, generally between 7.0 and 8.2. However, hydrogenated polydiene blocks are substantially different in chemical nature from polyvinyl aromatic blocks. Hence, solvents that effectively solubilize hydrogenated polydiene blocks are often poor solvents for polyvinyl aromatic blocks. As a result, the vinyl aromatic hydrocarbon blocks may interact and associate in the cement phase. Such association causes the apparent molecular weight of the block copolymer in the cement to be greater than the true molecular weight. We have observed that if the molecular weight of the block copolymer is greater than 25,000, the vinyl aromatic hydrocarbon block molecular weights are greater than 5000 and the total concentration of polymer is greater than 10 weight percent in a single solvent or a solvent blend in which the major solvent is a good solvent for the polydiene block, then emulsification with a conventional high shear mixing device, such as a rotor-stator mixer, usually produces a polydisperse emulsion with an average drop size greater than one to two microns. This is true even if substantial surfactant is added to reduce cement-water interfacial tension.

If the conjugated diene block is also grafted with polar functional groups which are capable of association and/or hydrogen bonding and for which the cement solvent is a poor solvent, then the polar groups may strongly associate in the cement. This also leads to higher apparent molecular weights in the cement. Emulsification of a solution of a functionalized block copolymer in a single solvent or a solvent blend in which the major solvent is a good solvent for the polydiene block also usually results in an emulsion having large average drop sizes.

We believe that the large drop sizes that are formed in such systems are due mainly to the high elasticity and viscosity of the hydrogenated conjugated diene/vinyl aromatic hydrocarbon block copolymer cements. In the process of emulsification, disperse phase droplets are continually broken into smaller droplets until the desired or minimum drop size is achieved. If the cement phase to be dispersed is elastic, then the cement tends to oppose drop breakup, resulting in large average drop sizes. Polymer entanglement and association increases the elasticity of the polymer cement and causes the droplets to resist breaking up during emulsification.

We also believe that the elasticity can be reduced by reducing the number of entanglements by causing these polymers to form polymeric micelles having a core of collapsed polyolefin blocks and a corona of extended polyvinyl aromatic hydrocarbon blocks. These micelles are formed when the polymer is dissolved in a solvent or solvent blend in which the major solvent is a good solvent for the vinyl aromatic hydrocarbon block, i.e., one which has a solubility parameter close to that of the vinyl aromatic hydrocarbon block, preferably from 8.3 to 9.5 and is a poor solvent for the hydrogenated polydiene block. In such a system, it is thermodynamically unfavorable for the individual micelles to overlap and entangle. Thus, the use of the solvent/cosolvent blend of this invention reduces entanglements between the micelles thereby reducing the interpolymer interactions that oppose drop breakup.

We have found that a cement-in-water emulsion can be made with an average droplet diameter of less than two microns from a cement containing between 15 and 35 weight percent of a high total molecular weight and high vinyl aromatic hydrocarbon block molecular weight copolymer or 10 to 30 weight percent of a functionalized block copolymer, an appropriate solvent for the vinyl aromatic hydrocarbon block, and one or more appropriate cosolvents. By high molecular weight, we mean generally 25,000 or above. By high polyvinyl aromatic block molecular weight, we mean that the vinyl aromatic hydrocarbon blocks have molecular weights of 5000 or more. Also, less surfactant is required in the aqueous phase and less mixing energy is required to prepare fine cement emulsions from cements containing these solvents and appropriate cosolvents. Moreover, the latexes formed by solvent stripping such cement emulsions have smaller average particle sizes, are more stable and resist creaming to a greater extent.

The solvent or cosolvent should be chosen on the basis of its compatibility with or its ability to interact with the particular polymer which is to be dispersed as a latex. The solvent should be one or more organic liquids that are good solvents for the vinyl aromatic hydrocarbon block. Hildebrand's solubility parameter is a measure of the total forces holding the molecules of a solid or a liquid together. It has the units of $(cal/cm^3)^{1/2}$. Every compound is characterized by a specific value of solubility parameter, although this value may not always be recorded in convenient literature references. Materials having similar solubility parameter values tend to be miscible. Those with significantly different solubility parameters tend to be immiscible although there are many exceptions to this behavior. Discussions of solubility parameter concepts are presented in (1) *Encyclopedia of Polymer Science and Technology*, Interscience, New York (1965), Vol. 3, page 833; (2) *Encyclopedia of Chemical Technology*, Interscience, New York (1971), Supplement Volume, page 889; and (3) *Polymer Handbook*, 3rd Ed., J. Brandup and E. H. Immergut (Eds.), 1989, John Wiley & Sons "Solubility Parameter Values," pages VII-519, which are herein incorporated by reference.

An appropriate solvent for a hydrogenated unfunctionalized block copolymer is one that effectively solubilizes the vinyl aromatic hydrocarbon blocks. An appropriate solvent for a functionalized hydrogenated block copolymer is one that effectively solubilizes the vinyl aromatic hydrocarbon blocks and solvates the grafted polar functional groups grafted to the polymer. A single solvent may do both. It preferably has a solubility parameter of 8.3 to 9.5 and it is a poor solvent for the hydrogenated polydiene block and is not miscible with water. An appropriate cosolvent is one that effectively solubilizes the hydrogenated rubber block of the block copolymer. It preferably has a solubility parameter of 7.0 to 8.2.

For unhydrogenated (functionalized or unfunctionalized block copolymers, it is preferred that the solvent have a solubility parameter in the range from 8.8 to 9.5 and the cosolvent have a solubility parameter in the range from 7.5 to 8.7.

Effective solvents must also be very immiscible with water. If water is miscible with the solvent, it will cause the polymer to precipitate from solution.

Because the solvents are chosen such that they effectively solubilize the vinyl aromatic hydrocarbon blocks and solvate any functional groups, they reduce interpolymer interactions. At a given polymer concentration, the presence of an appropriate solvent effectively reduces high shear elasticity and viscosity of the cement thereby allowing cement-in-water emulsions with smaller average drop sizes to be made. A cement-in-water emulsion with a smaller average drop size will yield a block copolymer latex with a smaller average particle size upon solvent removal, thereby improving the latex stability and performance.

Solvents for the vinyl aromatic hydrocarbon blocks preferably are used in an amount from 75 to 95 percent by weight of the total solvent in the cement depending on the solvent. If less than this amount is used, then the viscosity of the polymer cement is much too high and the level of polymer entanglement is such that small drop sizes are extremely difficult to achieve, even with high shear mixing equipment.

Hydrogenated block copolymers of vinyl aromatic hydrocarbons and conjugated dienes can dissolve as micelles in some vinyl aromatic hydrocarbon block solvents with solubility parameters at the low end of the range, about 8.5 or less, without the aid of a cosolvent. Examples of such solvents include methyl isobutyl ketone (8.4) and isobutyl acetate (8.3).

Examples of solvents which are good solvents for the vinyl aromatic hydrocarbon block and poor solvents for the polydiene block (and their solubility parameters) and are immiscible with water, include ethyl acetate (9.1) and propyl acetate (8.8). Others which can be used include ethyl formate (9.3), propyl formate (9.0), diethyl ketone (8.9), methyl propyl ketone (8.7), methyl isobutyl ketone (8.4), and isobutyl acetate (8.3).

Aromatic hydrocarbons (benzene [9.2], toluene [8.9], xylene [8.8], styrene [8.7]) are not effective solvents for this application because they tend to be good solvents for both vinyl aromatic blocks and hydrogenated rubber blocks.

Methyl ethyl ketone (9.3) is an example of a solvent having a solubility parameter in the range from 8.3 to 9.5 that is not effective in this application because it is partially miscible with water.

Many of the solvents known in the prior art to be useful in the preparation of hydrogenated polymers of conjugated dienes and/or vinyl aromatic hydrocarbons may be used as the cosolvent herein as long as they have a solubility parameter of 7.0 to 8.2. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof.

Base should be added to acid-functionalized cement emulsions to effect ionization of the acid groups on the block copolymer. Ionization of the acid groups leads to the formation of negatively charged droplets in the emulsion and negatively charged particles in the latex. The presence of surface charges on the emulsion drops and latex particles sets up an electric double layer of counter ions around the droplets or particles. The repulsion of these like-charged double layers in the emulsion or latex prevents coagulation and coalescence of droplets or particles, thereby stabilizing the emulsion or latex. Base should be added to the aqueous phase in the range of 0.1 to 3 equivalents of base to the aqueous phase. Preferably, add 0.3 to 1.5 equivalents of base per equivalent of acid.

The polymer cement containing the cosolvent is emulsified in an aqueous phase containing from 0.1 to 10 percent by weight of at least one surfactant. The surfactant serves two purposes: (1) It serves to reduce the cement-water interfacial tension which, in turn, reduces the amount of energy required to produce a fine dispersion of cement droplets. (2) It serves to prevent droplet coagulation and coalescence; that is, it stabilizes the emulsion as it is formed.

The amount of surfactant depends, in part, on the ratio of cement to aqueous phase and on the characteristics of the surfactant. If less than 0.1% based on total polymer (weight percent) is used, then insufficient surfactant may be present to reduce interfacial tension and stabilize the emulsion. More than 10% based on total organics is usually not necessary and is undesirable. If the latex is to be used in an adhesive, then no more than 2% based on total polymer (weight percent) should be used because surfactant molecules tend to migrate to the surface and interfere with adhesion.

The surfactants may be nonionic, anionic, cationic or a combination of two or more of these types. Artionic surfactants are generally more effective emulsifiers of block copolymer cements than nonionic surfactants. Mixtures of anionic and nonionic surfactants are frequently used.

Effective anionic surfactants include sulfonates and sulfates with the general formulas R-SO$_3$M and R-OSO$_3$M where R represents a hydrophobic moiety and M represents an alkali metal. Examples include sodium dodecyl sulfate, sodium lauryl sulfate, sodium salts of sulfated Neodol® alcohols, sodium salts of sulfated Neodol® ethoxylates, sodium dodecyl benzene sulfonate, sodium alkyl naphthalene sulfonate, sodium dioctyl sulfosuccinate. Salts of sulfated alkyl-phenol ethoxylates are also effective anionic emulsifiers. Examples of effective nonionic surfactant emulsifiers include the family of alkyl-phenol ethoxylates represented by the formula R—(OC$_2$H$_4$)$_n$OH, where R is usually an octyl or nonyl chain and n has a value from 1 to 35, preferably 4 to 15. Water soluble nonionic block copolymers, such as polyethylene oxide-polypropylene oxide block copolymers, and water soluble polyelectrolytes, o such as partially neutralized methacrylic acid copolymers, can also be used.

Specific examples of surfactants which are useful herein include Neodol® 25-S, Neodol® 23-3S, Neodol® 23-9S, Neodol® 45-S, Alipal® EP-110, Alipal® EP-120, Calsoft F90, Nekal® BA-77, Emcol 4500, octyl phenol ethoxylates having 1 to 35 ethylene oxide groups and nonyl phenol ethoxylates having 1 to 35 ethylene oxide groups such as the Igepal® CA & CO series sold commercially by Rhone-Poulenc. Water soluble nonionic block copolymers are also frequently used to stabilize latexes. Examples of the latter include the Synperonic T range of polypropylene oxide—polyethylene oxide block copolymers from ICI.

Emulsions can be prepared by contacting the aqueous surfactant solution and the polymer cement under conditions of high shear. Typical emulsification equipment includes the following: sonic horn, colloid mill, homogenizer, liquid whistle and high shear rotor-stator mixer. The amount of energy required to form an emulsion with a given average drop size depends largely upon the interfacial tension between the cement phase and the aqueous phase and the viscosity and elasticity of the cement phase. Low interfacial tensions and low cement viscosities and elasticities require less mixing energy to achieve a desired average drop size.

It is preferred, although not necessary, that the polymer cement containing the cosolvent be emulsified by adding the cement slowly to a known volume of water containing surfactant(s) which is agitated using a suitable emulsification device. This procedure promotes the efficient preparation of cement-in-water emulsions with small average drop sizes. However, the aqueous phase may also be added to the cement or they may simply be combined together at one time. Another preferred element of the process is that at least one anionic surfactant should be used because anionic surfactants are more effective emulsifiers of the cement emulsions at a given total surfactant concentration than are cationic or nonionic surfactants. Another preferred element of the process is that the minimal total surfactant level consistent with stable emulsions and latexes is used to reduce any negative effects of the surfactant on final product performance. Another preferred element of the process is that the surfactant or surfactants chosen do not cause extensive foaming during solvent stripping and concentration. The final emulsion may contain up to 75 weight percent of the cement as the dispersed phase. This is an aqueous phase to cement weight ratio of 1:3.

The solvent and the cosolvent are removed from the emulsion by standard flashing or stripping techniques. The temperature of stripping can range from 25° to 100° C. and the stripping pressure can range from 760 down to 10 millimeters of mercury. It is preferred to flash solvent by reducing the pressure on the emulsion and increasing the emulsion temperature moderately. Excess water may be removed at the same time or later in order to concentrate the resulting latex to the desired percent solids. Alternately, the latex can be concentrated using conventional centrifugation techniques or by creaming. Sufficient water is removed to concentrate the latex to from 15 weight percent polymer to 70 weight percent polymer.

The process of the present invention produces hydrogenated block copolymer latexes which are very stable and very fine, i.e., have average particle sizes of generally less than one to two microns and do not form substantial coagulum within 30 days of manufacture. Such polymer latexes are useful for producing water-borne coatings containing little or no solvent, and formulating into water-based adhesives including pressure sensitive adhesives, contact adhesives, and construction mastic adhesives.

EXAMPLE 1

A series of polymer cements were prepared in solvent blends of ethyl acetate and cyclohexane. Two polymers were studied: (Polymer A) a linear hydrogenated triblock copolymer, styrene-ethylene/butylene-styrene having block molecular weights of about 7000, 35,000, and 7000 respectively; and (Polymer B) a functionalized version of the same polymer containing about 1.8% by weight maleic acid grafted onto the ethylene-butylene block. The ethyl acetate-to-cyclohexane weight ratios in the blends varied from 5:95 to 95:5. The cements were rolled on a benchtop roller for 24 hours to enhance dissolution of the polymer.

Cement viscosities were measured with a Brookfield viscometer using spindle 31 at 12 rpm. Both polymer cements exhibited behavior consistent with micelle formation at high ethyl acetate:cyclohexane ratios.

The viscosity of Polymer A (unfunctionalized) cements decreased through a shallow minimum as the ethyl acetate:cyclohexane ratio was increased from 5:95. At ethyl acetate:cyclohexane ratios greater than 50:50, the cement viscosity increased rapidly. The cement was a clear gel at an ethyl acetate:cement ratio of 70:30. This rapid increase in viscosity between ethyl acetate:cyclohexane ratios of 50:50 and 70:30 is due to structuring effects but is not consistent with the formation of spherical micelles. As the ratio of ethyl acetate to cyclohexane was increased to 80:20, the cement became slightly turbid with a light blue tint indicating the presence of polymeric micelles. At this point the solvent blend of the cement was still gel-like. However, under relatively low shear (hand shaking), the gel broke down and flowed like a liquid. This behavior is consistent with the formation of a macrolattice of micelles. It is known to occur in concentrated polymer solutions where micelles effectively fill the entire solution volume.

Above an ethyl acetate:cyclohexane ratio of 87:13, Polymer A did not fully dissolve in the solvent blend at room temperature, because the ethylene-butylene midblocks were not solvated sufficiently to allow association and micelle formation. Increasing temperature would have enhanced dissolution.

The viscosity behavior of the Polymer B (functionalized) cements was similar to that of the Polymer A cements below an ethyl acetate to cyclohexane ratio of 60:40. At very low ethyl acetate concentrations, the viscosity of Polymer B is much higher than that of Polymer A due to hydrogen bonding and association of maleic acid groups on neighboring polymers. Solvation of the maleic acid groups with ethyl acetate interferes with intermolecular interactions and effects a very substantial drop in viscosity.

The viscosity of the Polymer B cements increased greatly beyond an ethyl acetate:cyclohexane ratio of 60:40 although it never gelled. As the ethyl acetate to cyclohexane ratio was increased to 80:20 the polymer cement developed a blue tint indicating the presence of micelles. In addition, the viscosity dropped rapidly to very low values, which is also consistent with the formation of micelles that do not form a macrolattice structure.

EXAMPLE 2

The cements were emulsified in aqueous solutions containing 1 percent by weight of sodium dioctyl naphthalene sulfonate as the surfactant. The cement to water weight ratio was 50:50 in all emulsions. The emulsions were prepared batchwise using a Silverson high shear rotor-stator mixer. Foaming during emulsification decreased significantly at high ethyl acetate concentrations.

The emulsion drop size distributions were measured by dynamic light scattering using a Malvern Zeta Sizer 3 for emulsions having average drop sizes less than 3.0 microns. Drop size distributions for other emulsions were determined by optical microscopy. Average (mean) cement emulsion drop size (diameter) and phase stability results are shown in Table 1 below. Phase stability is reported in terms of the percentage of clear aqueous phase present at 24 hours. The appearance of a clear aqueous phase indicates creaming of large emulsion droplets. We observed that both Polymer A and Polymer B cement emulsion mean drop sizes were less than one to two microns only when Polymer A and Polymer B micelles were believed to have formed in the cements.

TABLE 1

Polymer A and Polymer B Cement Emulsion Drop Sizes and Phase Stabilities

| | Polymer A[1] | | Polymer B[2] | |
|---|---|---|---|---|
| EA:CH Ratio | Mean Drop Size (μ) | Clear Aqueous Phase @ 24 hrs % | Mean Drop Size (μ) | Clear Aqueous Phase @ 24 hrs % |
| 5:95 | >>1 | 25 | * | * |
| 10:90 | >>1 | 25 | >>1 | 20 |
| 20:80 | 2.5 | 25 | >>1 | 20 |
| 30:70 | 2.3 | 0 | >>1 | 20 |
| 40:60 | 1.9 | 0 | >>1 | 20 |
| 50:50 | 1.3 | 0 | >>1 | 20 |
| 60:40 | >>1 | 30 | >>1 | 50 |
| 65:35 | * | * | >>1 | 50 |
| 70:30 | 1.2 (m) | 0 | >>1 | 50 |
| 80:20 | 0.69 (m) | 0 | 1.7 (m) | 30 |
| 82.5:17.5 | * | * | 1.2 (m) | 0 |
| 85:15 | 0.60 (m) | 0 | 1.1 (m) | 0 |
| 85:15[3] | 0.62 (m) | 0 | * | * |
| 87.5:12.5 | ** | ** | 0.82 (m) | 0 |
| 90:10 | ** | ** | 1.3 (m) | 0 |
| 95:5 | ** | ** | >>1 | 50 |

[1]Initial mixer speed set to 10,000 rpm.
[2]Initial mixer speed set to 8000 rpm.
[3]Blend mixture 85:15 propyl acetate:cyclohexane.
*Did not prepare a cement using this solvent blend.
**Polymer did not dissolve in cement.
(m) Appearance of cement was consistent with presence of polymeric micelles.

Most of the emulsions described in the table were made with ethyl acetate. However, one was made with propyl acetate and the results shown at a propyl acetate to cyclohexane ratio of 85:15 are almost exactly the same as the corresponding emulsion made with ethyl acetate. These results support the hypothesis that cement-in-water emulsion drop size depends, in part, on high shear cement rheology. Because cement elasticity opposes drop breakup, cement formulations providing for low elasticity are desirable. The formation of micelles provides for low elasticities at high shear rates and, therefore, small emulsion drop sizes. These results demonstrate that very small drop size polymer cement emulsions can be made from high polymer cements using a high shear rotor-stator mixer. In-line rotor-stator mixers are commonly used for the continuous manufacture of emulsions on a commercial scale.

EXAMPLE 3

One hundred grams of a 20% by weight solution of Polymer B in an 85:15 blend of ethyl acetate:cyclohexane were emulsified in 100 g of an aqueous solution containing 1% by weight of sodium dioctyl naphthalene sulfonate as surfactant. A Silverson mixer operating at 13000 RPM was used to prepare the emulsion. The average drop size (diameter) of the cement-in-water emulsion was determined by dynamic light scattering to be 0.42 microns.

EXAMPLE 4

Seventy-five grams of a 20% by weight solution of Polymer B in an 80:20 blend of ethyl acetate:cyclohexane were emulsified in 75 g of an aqueous solution containing 1% by weight of sodium dodecyl sulfate as surfactant. A Silverson mixer operating at 13000 RPM was used to prepare the cement emulsion.

Solvent and excess water were removed in a rotary evaporator operating at 55° C. under vacuum to produce the corresponding latex. The dispersion was concentrated from an initial solids (polymer) content of 10.0% by weight to a final solids content of 40.4% by weight. The average particle size (diameter) of the latex was determined by dynamic light scattering to be 0.57 microns.

The latex was left in a quiescent state for a period of three days. After this period, the latex was sampled and coagulum was determined to be 0.2% by weight. Coagulum was determined from the amount of nonvolatile (dried) material that did not pass through a 100 mesh screen. It is reported as a percentage of total solids in the sample. Coagulum is a measure of the latex stability and refers to macroscopic particles of polymer.

The latex was then left in a quiescent state for an additional 28 days (31 days beyond solvent stripping). No coagulum was collected on a 100 mesh screen at the end of this period indicating that the latex was very stable. Average particle size was determined by dynamic light scattering to be 0.55 microns.

EXAMPLE 5

Fifty grams of a 20% by weight solution of Polymer B in an 85:15 blend of ethyl acetate:cyclohexane were emulsified in 50 g of an aqueous solution containing 1% by weight of sodium dodecyl sulfate as surfactant. A sonic horn (ultrasound) was used to prepare the emulsion. The resulting emulsion had an average drop size of 0.23 microns as measured by dynamic light scattering.

Solvent and excess water were removed in a rotary evaporator operating at 58° C. under vacuum. The resulting latex was determined to be 30.2% solids and had an average drop size, by dynamic light scattering, of 0.22 microns. The results achieved with standard mixers compare favorably to those achieved with this high intensity mixing method.

EXAMPLE 6

Two latex samples were prepared using a linear hydrogenated triblock copolymer (Polymer C) with the following structure: styrene-ethylene/butylene-styrene. Each styrene block had a molecular weight of approximately 7000 and the ethylene-butylene midblock had a molecular weight of approximately 35,000. In addition, about 3.3% by weight maleic acid was grafted to the ethylene-butylene midblock.

Two cement emulsions were prepared. For each, 100 g of a 20% by weight solution of Polymer C in an 85:15 blend of ethylene acetate:cyclohexane were emulsifide in 100 gm of an aqueous solution containing 0.24% ammonium hydroxide. No surfactant was used in the preparation of the first cement emulsion. The aqueous phase used in the preparation of the second emulsion contained 0.5% by weight sodium dioctyl naphthalene sulfonate. A Silverson mixer operating at 10,000 RPM was used to prepare both cement emulsions.

Ammonium hydroxide was added to effect ionization of the maleic acid groups on the block copolymer. Ionization of the acid groups leads to the formation of charged droplets in the emulsion and charged particles in the latex. The presence of surface charges on the emulsion drops and latex particles set, up an electric double layer of counter ions, in this case ammonium ions, around the droplets or particles. The repulsion of these like-charged double layers in the emulsion or latex prevents coagulation and coalescence, thereby stabilizing the emulsion or latex.

TABLE 2

Cement Emulsion Characteristics

|  | Ph | Mean Drop Size (by dynamic light scattering) |
|---|---|---|
| Emulsion 1 (no surfactant) | 7.2 | 1.10 microns |
| Emulsion 2 (with surfactant) | 6.1 | 0.60 microns |

Solvent and excess water were removed from each emulsion in a rotary evaporator operating at 58° C. under vacuum. Particle size and coagulum formation were measured immediately after solvent stripping and then again after 7 days and 30 days. Results are shown below.

TABLE 3

Latex Particle Size and Coagulum Formation Over 30 Days

|  | Latex 1 (no surfactant) | Latex 2 (with surfactant) |
|---|---|---|
| Immediate |  |  |
| pH | 5.6 | 6.2 |
| Particle Size (microns) | 1.00 | 0.60 |
| Coagulum (as % of solids) | 14% | 0% |
| Seven Days |  |  |
| pH | 5.6 | 6.0 |
| Particle Size (microns) | 1.14 | 0.66 |
| Coagulum (as % of solids) | 0% | 0% |
| Thirty Days |  |  |
| pH | 5.6 | 5.8 |
| Particle Size (microns) | 1.14 | 0.64 |
| Coagulum (as % of solids) | 0% | 0% |

These results show that a small drop size latex can be prepared without the use of a surfactant. This is possible because the interfacial tension between water and a solution that is primarily ethyl acetate is low. (The interfacial tension between pure water and pure ethyl acetate is cited as 6.8 dyne-cm, Reference: Jufu, F., L. Buqiang, W. Zihao, "Estimation of Fluid-Fluid Interfacial Tensions of Multicomponent Mixtures," Chemical Engineering Science, Vol. 41, No. 10, pp. 2673-2679, 1986.) However, the addition of a small amount of surfactant clearly effects an emulsion, and corresponding latex, with a smaller average drop size is the result.

EXAMPLE 7

A 20% solution of a hydrogenated styrene-butadiene-styrene block copolymer having a molecular weight of about 50,000 and a styrene content of about 30% and having 4.5 weight percent maleic anhydride grafted onto the hydrogenated diene block (Polymer D) was prepared in a solvent system consisting of 85% ethyl acetate and 15% cyclohexane. Three emulsions were prepared with this polymer solution using a sonic horn. In all three cases the water contained 0.068 moles of ammonia/gram of polymer in order to provide base to ionize the maleic acid groups along the polymer.

Either no surfactant, 0.1 phr, or 0.5 phr SDS (sodium dodecyl sulfate) was added to the water phr is parts per hundred rubber and the rubber is the polymer. The following table shows that initial particle sizes for the emulsion were 1.23, 1.05, and 0.7 microns, respectively. A clear phase did not form in any of these emulsions which means that the emulsions were stable. Emulsions were successfully rotovaped to remove the ethyl acetate and cyclohexane resulting in polymer dispersions in water. These dispersions were also stable. No clear phases were noticed in any of the systems after rotovaping or up to 7 days storage of the dispersion. Some coagulum was formed in the dispersions as a result of rotovaping (removing the solvent while under vacuum) and more coagulum occurred during storage. These coagulum amounts are listed in the table. Coagulum arises from de-stabilized polymer particles which agglomerate forming clumps of rubber in the water. The greater amount of coagulum generated in the "no surfactant" dispersion shows that some small amount of surfactant is beneficial in stabilizing the dispersions. However, a successful dispersion was still formed in the absence of any surfactant.

TABLE 4

| Surfactant | Post Emulsification | | | | Post Rotovap | | | | |
|---|---|---|---|---|---|---|---|---|---|
|  | pH | Particle Size Microns | % Clear Phase | Time/ Days | pH | Particle Size Microns | % Clear Phase | % Solids | % Coagulum |
| None | 8.2 | 1.23 | 0 | 0 | 6.87 |  | 0 | 31.6 | 0.47 |
|  |  |  |  | 1 |  |  | 0 | 30.9 |  |
|  |  |  |  | 2 |  | 1.33 | 0 |  |  |
|  |  |  |  | 7 |  |  | 0 | 31.1 | 0.115 |
| 0.1 phr SDS | 8.1 | 1.05 | 0 | 0 | 7.26 |  | 0 | 16.9 | 0.039 |
|  |  |  |  | 1 |  | 0.961 | 0 | 16.9 |  |
|  |  |  |  | 7 |  |  | 0 | 16.9 | 0.034 |
| 0.5 phr SDS | 8.5 | 0.7 | 0 | 0 | 7.35 |  | 0 | 14.6 | 0.188 |
|  |  |  |  | 1 |  | 0.64 | 0 | 14.5 |  |
|  |  |  |  | 7 |  |  | 0 | 14.5 | 0.047 |

We claim:

1. A process for producing stable polymer cement emulsions with an average particle size of less than two microns, which comprises
    (a) making a polymer cement of a hydrogenated block copolymer of a conjugated diene and a vinyl aromatic hydrocarbon having an overall peak molecular weight as determined by gel permeation chromatography of 25,000 or more and a vinyl aromatic hydrocarbon block peak molecular weight as determined by gel permeation chromatography of 5000 or more and a blend of from 75 to 85 percent by weight of a non-aromatic solvent for the vinyl aromatic hydrocarbon block which has a solubility parameter in the range from 8.3 to 9.5, is a poor solvent for the conjugated diene blocks, and is immiscible with water, and from 15 to 25 percent by weight of the blend of a non-aromatic cosolvent having a solubility parameter of 7.0 to 8.2; and
    (b) emulsifying the polymer cement at an aqueous phase to cement weight ratio of from 10:1 to 1:3 by combining it with an aqueous phase containing from 0.1 to 10 weight percent of the aqueous phase of one or more surfactants.

2. The process of claim 1 wherein the solvent for the vinyl aromatic hydrocarbon is selected from the group consisting of ethyl acetate, propyl acetate, ethyl formate, propyl formate, diethyl ketone, methyl propyl ketone, methyl isobutyl ketone, and isobutyl acetate.

3. The process of claim 1 wherein the aqueous phase to cement weight ratio is from 2:1 to 1:3.

4. The process of claim 1 wherein the total amount of surfactant used is not more than 2 percent by weight of the polymer.

5. The process of claim 1 wherein a latex is formed by removing solvent, cosolvent, and excess water from the emulsion formed in step (b).

6. A process for producing stable polymer cement emulsions with an average particle size of less than two microns, which comprises:
    (a) making a polymer cement of a block copolymer of a conjugated diene and a vinyl aromatic hydrocarbon having an overall peak molecular weight as determined by gel permeation chromatography of 25,000 or more and a vinyl aromatic hydrocarbon block molecular weight of 5000 or more which has been functionalized with polar groups and a blend of from 75 to 95 percent by weight of a non-aromatic solvent for the vinyl aromatic hydrocarbon block which has a solubility parameter in the range from 8.3 to 9.5, is a poor solvent for the conjugated diene blocks, and is immiscible with water, and from 5 to 25 percent by weight of the blend of a non-aromatic cosolvent having a solubility parameter of 7.0 to 8.2; and
    (b) emulsifying the polymer cement at an aqueous phase to cement weight ratio of from 10:1 to 1:3 by combining it with an aqueous phase containing from 0.1 to 10 weight percent of the aqueous phase of one or more surfactants.

7. The process of claim 6 wherein the solvent for the vinyl aromatic hydrocarbon block is selected from the group consisting of ethyl acetate, methyl propyl ketone, diethyl ketone, propyl formate, ethyl formate, propyl acetate, methyl isobutyl ketone, and isobutyl acetate.

8. The process of claim 6 wherein the aqueous phase to cement weight ratio is from 2:1 to 1:3.

9. The process of claim 6 wherein the amount of surfactant used is not more than 2 percent by weight of the polymer.

10. The process of claim 6 wherein a latex is formed by removing solvent, cosolvent, and excess water from the emulsion formed in step (b).

11. The process of claim 6 wherein a base is added to the polymer cement.

12. The process of claim 11 wherein from 0.1 to 3.0 equivalents of base are added per equivalent of acid.

13. The process of claim 6 wherein the solvent for the vinyl aromatic hydrocarbon block has a solubility parameter of 8.3 to 8.5 and no cosolvent is used.

14. The process of claim 13 wherein the solvent is selected from the group consisting of methyl isobutyl ketone and isobutyl acetate.

* * * * *